US008907845B2

(12) United States Patent
Jones (10) Patent No.: US 8,907,845 B2
(45) Date of Patent: Dec. 9, 2014

(54) ANTENNA FAILURE COMPENSATION (75) Inventor: David Kelvin Jones, Guildford (GB)

(73) Assignee: BAE Systems PLC, London (GB)

( * ) Notice: Subject to any disclaimer, the term of this patent is extended or adjusted under 35 U.S.C. 154(b) by 237 days.

(21) Appl. No.: 13/395,032

(22) PCT Filed: Sep. 2, 2010

(86) PCT No.: PCT/GB2010/051449
§ 371 (c)(1),
(2), (4) Date: Mar. 8, 2012

(87) PCT Pub. No.: WO2011/030125
PCT Pub. Date: Mar. 17, 2011

(65) Prior Publication Data
US 2012/0169540 A1    Jul. 5, 2012

(30) Foreign Application Priority Data

Sep. 9, 2009  (EP) ..................................... 09275073
Sep. 9, 2009  (GB) ................................... 0915753.8

(51) Int. Cl.
*H01Q 3/00*      (2006.01)
*G01S 7/40*      (2006.01)
(52) U.S. Cl.
USPC ....................................................... 342/368
(58) Field of Classification Search
CPC .... G01S 7/4004; G01S 13/4463; H01Q 3/267
USPC ......... 342/368, 360, 378–384, 427, 173–174, 342/149–154
See application file for complete search history.

(56) References Cited

U.S. PATENT DOCUMENTS

| 3,604,000 | A | * | 9/1971 | Briana et al. ................... 342/173 |
| 4,811,023 | A | * | 3/1989 | Gelernter et al. ............. 343/703 |
| 5,083,131 | A | | 1/1992 | Julian |
| 5,416,489 | A | | 5/1995 | Mailloux |

(Continued)

FOREIGN PATENT DOCUMENTS

JP   2005-260339   9/2005
WO   WO 2004/030147 A1   4/2004

OTHER PUBLICATIONS

International Preliminary Report on Patentability and Written Opinion, dated Mar. 22, 2012 from related International Application No. PCT/GB2010/051449.

(Continued)

*Primary Examiner* — Cassie Galt
(74) *Attorney, Agent, or Firm* — Scully, Scott, Murphy & Presser, P.C.

(57) ABSTRACT

A method for compensating for the failure of an element in a phased array antenna assembly is provided. After failure of an element of the assembly, a composite pattern is generated from signals received by respective elements in the antenna assembly. This generated pattern is then compared to a standard composite pattern which was generated prior to the failure. Thus the necessity for remedial action can be assessed. If necessary, initial values for parameters associated with each element are assumed and an optimization is performed on the parameters. Consequently, a composite pattern can be generated which approximates the standard composite pattern. Once optimization has been achieved, the optimized parameters are applied to base settings for the assembly and operation of the phased array antenna assembly can be continued.

11 Claims, 6 Drawing Sheets

(56) References Cited

U.S. PATENT DOCUMENTS

| | | | |
|---|---|---|---|
| 5,559,519 A | | 9/1996 | Fenner |
| 5,818,388 A * | | 10/1998 | Lane et al. ............... 342/373 |
| 6,140,976 A | | 10/2000 | Locke et al. |
| 6,339,398 B1 | | 1/2002 | Redvik et al. |
| 6,741,205 B2 * | | 5/2004 | Nagasaku ............... 342/174 |
| 7,453,398 B2 * | | 11/2008 | Rouzeaud et al. ......... 342/368 |
| 8,049,661 B1 * | | 11/2011 | Loberger ............... 342/173 |
| 2011/0241941 A1 * | | 10/2011 | Krich et al. ............... 342/373 |

OTHER PUBLICATIONS

Levitas, Menachem et al., "Practical Failure Compensation in Active Phased Arrays", IEEE Transactions of Antennas and Propagation (Mar. 1999), vol. 47, No. 3, pp. 524-535.

Battacharyya, Arun K., "Phased Array Antennas", 2005, Wiley-Interscience, Hoboken, NJ, pp. 159-162.

Steyskal, H. et al., "Generalisation of an array-failure-correction method", IEE Proceedings: Microwaves, Antennas and Propagation, (Aug. 1998), vol. 145, No. 4, pp. 332-336.

Peters, Timothy J., "A Conjugate Gradient-Based Algorithm to Minimize the Sidelobe Level of Planar Arrays with Element Failures", IEEE Transactions on Antennas and Propagation (Oct. 1991), vol. 39, No. 10, pp. 1497-1504.

Redvik, J., "Simulated Annealing Optimization Applied to Antenna Arrays With Failed Elements", Antennas and Propagation Society, IEEE International Symposium (1999), vol. 1, pp. 458-461.

Wright, P.J. et al., "Re-Optimisation of Linear and Planar Arrays With Failed Elements", Antennas and Propagation, Ninth International Conference on (Conference Publication No. 407), Jan. 1, 1995, pp. 81-84.

Keizer, Will P.M.N., "Element Failure Correction for a Large Monopulse Phased Array Antenna With Active Amplitude Weighting", IEEE Transactions on Antennas and Propagation (Aug. 2007), vol. 55, No, 8, pp. 2211-2218.

International Search Report dated Nov. 5, 2010 issued in PCT/GB2010/051449.

European Search Report dated Oct. 23, 2009 issued in EP 09 27 5073.

UK Search Report dated Dec. 17, 2009 issued in GB0915753.8.

* cited by examiner

ANTENNA FAILURE COMPENSATION

The present invention relates to radar installations comprising an active phased array antenna assembly. In particular, it relates to a method for compensating for the failure of one or more elements of such an installation.

In a passive array, a single transmitter and receiver are connected to an antenna via transmission lines that incur significant RF loss. In an active array, each of a number of radiating elements is connected directly to a transmit/receive unit (TRU) to minimise RF losses between the antenna, a final stage power amplifier of the transmitter and the receiver. This architecture significantly reduces RF losses improving the system over that of a passive array system.

Active phased arrays are frequently used in applications where several thousand modules form the array. Each module comprises an antenna element and a transmit/receive unit (TRU). Failure of a single module makes an insignificant difference to radar performance when the single module is one in, say, several thousand. As the number of module failures increases, the performance of the array gradually degrades due to an associated loss in transmit power. Furthermore, consequential irregularities in the antenna amplitude distribution, raises side lobes and can cause beam distortion and loss of gain. Failure of up to 5% of the modules can be tolerated if the failures are randomly distributed across the array face. Designing the array with an excess of, say, 5% more modules than the number needed to achieve a specified performance enables the array to continue to operate within the specification until more than 5% of the modules have failed.

In some applications, groups of modules are connected together on receive to form sub-arrays. The output from each sub-array is down converted to an intermediate frequency (IF) or to a digital signal and can then be used to adaptively change the antenna pattern as a means of countering barrage and pulse noise jamming. The use of sub-array groupings makes the array more vulnerable to failure if, for instance, a number of modules in a sub-array were to fail or if the sub-array receiver failed. Failure of a significant proportion of the modules in a single sub-array has a noticeable distorting effect on a received formed beam. Gain of the formed beam and therefore the detection performance and accuracy of an angle measurement associated with the beam is, consequently, reduced.

It is desirable to minimise the impact of the failure of any such modules or sub-arrays of said modules.

According to a first aspect, the present invention provides a method for compensating for the failure of an element in a phased array antenna assembly, the method comprising the steps of:

a) generating a composite pattern from signals received by respective elements in the antenna assembly after failure of an element of the assembly;

b) comparing the pattern to a standard composite pattern generated prior to the failure to assess necessity for remedial action;

c) assuming initial values for parameters associated with each element;

d) performing optimisation on the parameters to generate a composite pattern which approximates the standard composite pattern;

e) applying optimised parameters to base settings for the assembly; and f) continuing with operation of the phased array antenna assembly.

By providing a method for compensating for the failure of an element in a phased array antenna assembly, operation of the assembly can be continued with little or no down time for the period in which replacement of the failed components are sourced and a corresponding maintenance task is scheduled. In particular, by optimising standard parameters associated with each element and modifying the base settings for the assembly accordingly, based on output from the assembly, a robust compensation method can be achieved that substantially approximates the normal operation of the antenna assembly prior to such a failure occurring.

The optimisation step (d) may comprise the steps of (i) generating a modified composite pattern based on the optimised parameters; and (ii) comparing the modified pattern to the standard pattern to assess whether acceptable performance is achieved.

The generating steps (a) and (i) may comprise generating a monopulse pattern for the entire antenna array assembly and the comparing steps b) and ii) may comprise comparing the monopulse pattern with a standard monopulse pattern generated prior to the failure, in addition to assessing any variation in the, or each, composite pattern from a standard composite pattern. The optimisation step (d) may, therefore, also use the monopulse pattern in addition to the composite pattern.

The generating steps (a) and (i) may comprise generating a curve of antenna pattern difference/sum ratio (WE) plotted against offset angle α, hereinafter referred to as the Δ/Σ, curve, for the entire antenna array assembly and the comparing steps (b) and (ii) may comprise comparing the Δ/Σ curve with a standard Δ/Σ, curve generated prior to the failure, in addition to assessing any variation in the, or each, composite pattern from a standard composite pattern. The optimisation step (d) may, therefore, also use the Δ/Σ, curve in addition to the composite pattern.

The parameters may be phase and amplitude.

The element may be an antenna element or it may be a module comprising an antenna element. Alternatively, the element may be a sub-array comprising at least one module, the, or each, module may comprise an antenna element and the, or each, parameter may be associated with the, or each, module of the sub-array.

The applying step (e) may apply modified parameters to modules in selected sub-arrays of the assembly. The modified parameters may be applied to sub-arrays located directly adjacent to the failed sub-array or, alternatively, the modified parameters may be applied to sub-arrays located remotely from the failed sub-array in a balanced manner. The applying step (e) may apply modified parameters to modules in all sub-arrays of the assembly. Characteristics of the failure together with a location of the, or each, sub-array to which modified parameters are applied may be recorded in a library and the method may comprise a step of interrogating the library to ascertain the sub-arrays to which modified parameters are to be applied.

The generating step (a) may be undertaken during a routine monitoring process. The method may comprise a step of monitoring phase and amplitude of composite patterns generated in generating step (a) to detect failure of an element. The method may comprise a step of calculating standard patterns and/or curves, prior to failure.

According to a second aspect, the present invention provides a phased array antenna assembly comprising:

a plurality of modules, each module comprising an antenna element; and a controller, for controlling the antenna assembly, configured to perform the aforementioned method.

According to a third aspect, the present invention provides a radar installation comprising a phased array antenna assembly of the aforementioned type.

The present invention will now be described in more detail, by way of example only, with reference to the accompanying drawings in which.

Figure 1:
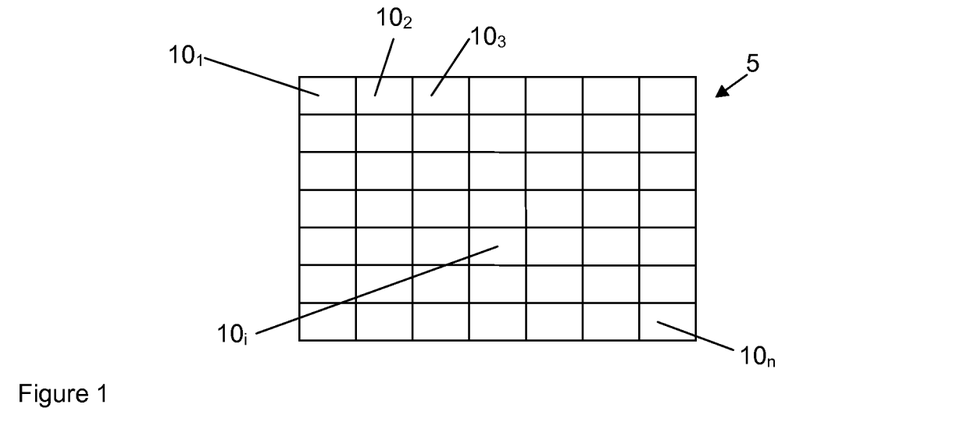
FIG. 1 shows a schematic representation of a phased array antenna assembly.
Figure 2:
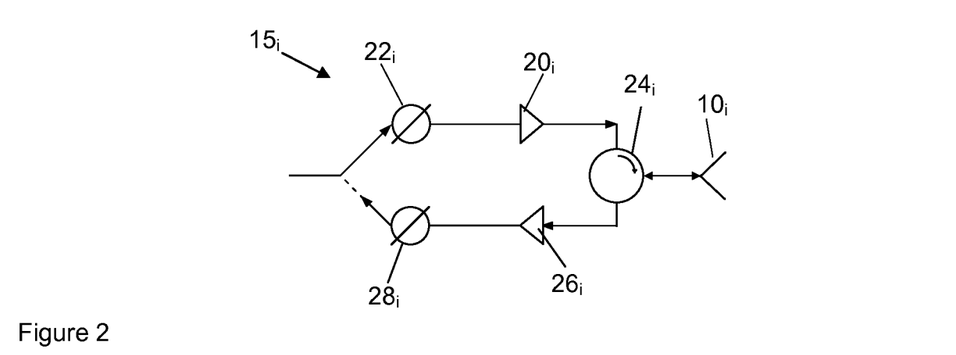
FIG. 2 shows a basic schematic representation of a transmit/receive module of the phased array of FIG. 1.

FIGS. 1 and 2 illustrate a schematic representation of a phased array antenna assembly 5. Each rectangle of FIG. 1 represents a radiating antenna element $10_1$-$10_n$, where 'n' denotes the total number of radiating elements present in the phased array. FIG. 2 is a basic representation of a module $15_i$ of the assembly 5. Each module $15_i$ comprises an element $10_i$ in combination with a power amplifier $20_i$ and a phase shifter $22_i$, for transmitting a signal from the module $15_i$ via the radiating element $10_i$. The phase shifter $22_i$ is used to establish a beam steering direction and the power amplifier $20_i$ is used to establish a correct input level for a module amplifier to operate with maximum efficiency.

Prior to transmission, the signal passes through a circulator $24_i$ which serves to separate "send" signals from "receive" signals. A so called "sum" beam is, thus, formed in free space in the desired direction. In this example, the outputs of the amplifiers of respective modules are saturated and, thus, give a uniform amplitude distribution across the array antenna assembly 5 for maximum transmit efficiency.

A return signal received by element $10_i$ passes through circulator $24_i$ to a low noise amplifier $26_i$ and on to another phase shifter $28_i$. The modules $15_i$ work in combination to form interrogating signals having particular characteristics, techniques generally referred to as beam forming and beam steering.

In a phased array, the interrogating signal is typically transmitted as a narrow beam in a particular direction so as to define the approximate location of particular target. The range to the target is determined by timing the returned signal. It is desirable to be able to determine more accurately the particular bearing ($\alpha$) and/or elevation ($\beta$) of the target. The approximate bearing ($\alpha$) and elevation ($\beta$) of the target is known within a large tolerance as defined by an extent of an offset from a boresight of the interrogating signal. This offset represents the signal strength at a particular position in the beam width of the interrogating signal.

A conventional method of more accurately determining the actual bearing ($\alpha$) and elevation ($\beta$) of the target, within the beam, is to use a "monopulse" technique. In other words, each angle ($\alpha$,$\beta$) is determined in a single measurement (hence monopulse) by using two beams rather than one in each plane of measurement. Hereinafter, a single angle, the azimuth angle or bearing ($\alpha$) is referred to but the discussion is equally applicable to angles of elevation ($\beta$).

Figure 3:
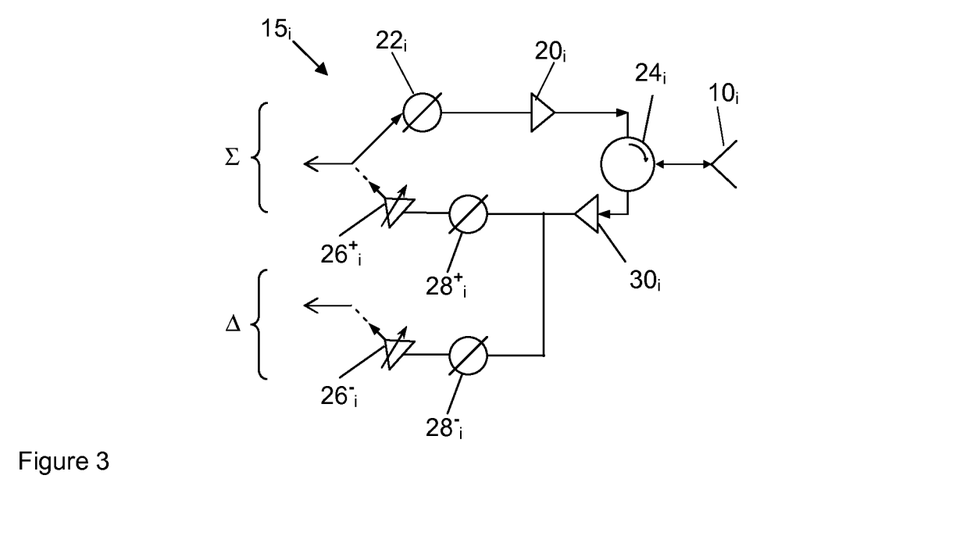
FIG. 3 shows a more sophisticated schematic representation of a transmit/receive module of FIG. 1.

Of the two received beams, the first beam is a "sum beam" ($\Sigma$) and the second beam is a "difference beam" ($\Delta$), the beams are generated by associated sum and difference networks ($\Sigma$, $\Delta$) within each module $15_i$ as illustrated in FIG. 3. The received signals are routed through the circulator $24_i$ to a low noise amplifier (LNA) $30_i$, the signals are then split into two. A first signal continues through the sum beam network ($\Sigma$) where appropriate amplitude and phase values are applied using a variable amplifier $26^+_i$ and a phase shifter $28^+_i$ respectively, to form a received sum pattern. A second signal is routed through the difference beam network ($\Delta$) where appropriate amplitude and phase values are applied using a variable amplifier $26^-_i$ and a phase shifter $28^-_i$ respectively, to form a received difference pattern.

Composite sum ($\Sigma$) and difference ($\Delta$) beams are formed by connecting RF signals to form sub-arrays for the outputs from each of the sum and difference beam forming networks, in this case at RF. Final sum and difference beams are then formed separately (after undergoing digital down conversion of the respective sub-array outputs) using appropriate digital summing networks.

Figure 4:
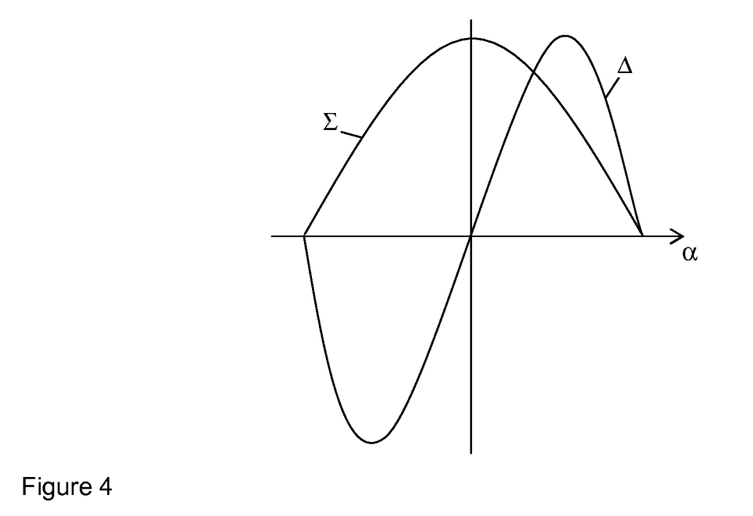
FIG. 4 shows a graphical representation of two signals received by the installation represented in FIG. 3.
Figure 5:
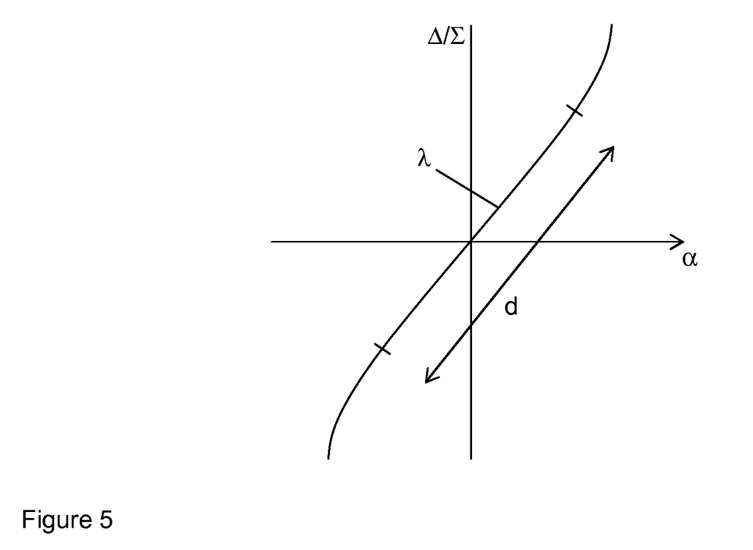
FIG. 5 shows a graphical representation of a relationship between the plots of FIG. 4.

The two beams may be plotted as shown in FIG. 4, the difference beam ($\Delta$) being imposed onto a trace of the sum beam ($\Sigma$). The abscissa represents the azimuth ($\alpha$) plot and is shown with the central datum representing the boresight. At any particular angle, represented along the abscissa, the ratio of the amplitudes of the two signals (the difference beam ($\Delta$)/sum beam ($\Sigma$)) is unique. It so happens that the relationship between the ratio ($\Delta$/$\Sigma$) and the azimuth angle ($\alpha$) of the target or bearing, is quite linear as depicted in FIG. 5. This type of curve is hereinafter referred to as the $\Delta$/$\Sigma$ curve. As the sum signal ($\Sigma$) approaches zero (as shown in FIG. 4) the trace of the ratio varying with angle tends to infinity. It follows that the linear relationship (having a gradient $\lambda$) extends to approximately the width of the primary beam of the sum signal. The linearity of this curve enables the bearing a of the target to be readily ascertained.

In the present embodiment, the phased array antenna assembly 5 is provided with Built In Test Equipment (BITE) which serves to monitor the performance and characteristics of each and every module $15_i$ in the assembly 5. Upon manufacture and/or installation of the assembly 5, each module $15_i$ is tested and calibrated to ensure that the pattern shape, side lobes and phase shifter settings, also referred to as "base settings", required thereby are appropriate. Standard coefficients, e.g. phase "$\phi$" and amplitude "a", to be applied to each module $15_i$ during subsequent operation of the assembly are thereby generated. Once these standard coefficients $\phi$, a are applied to the received signals, the resulting output from each module defines a "standard template".

In operation, the BITE monitoring facility is used at intervals to assess the current characteristics of each respective module $15_i$ on both send and receive and to compare these characteristics to the predetermined standard templates. If differences are identified, further investigations can be undertaken.

Figure 6:
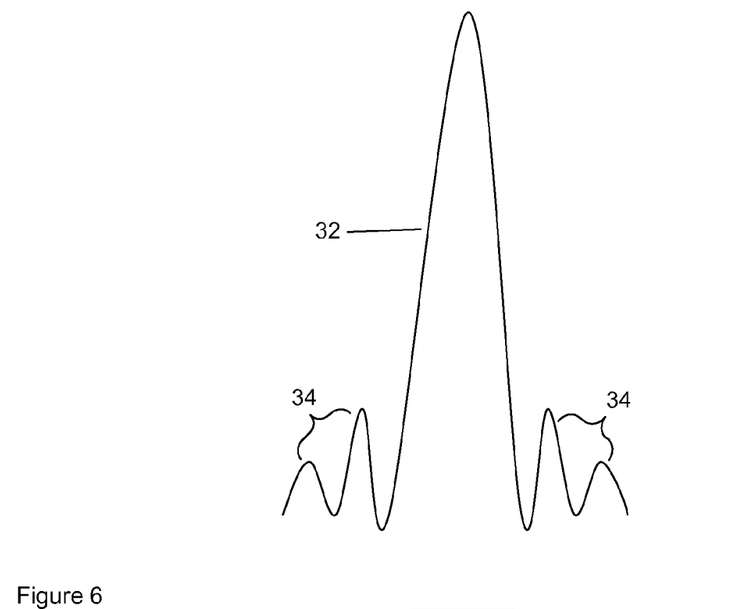
FIG. 6 represents a far field pattern from an antenna assembly without failed modules or sub-arrays.

FIG. 6 represents a far field pattern from a fully operational antenna assembly 5 i.e. one not suffering from any failed modules $15_f$. A "far field pattern" is a composite pattern made up from the output from each respective module $15_i$ of the antenna assembly 5. The main beam 32 is narrow and of high gain and the side lobes 34 are symmetrical and minimised.

Figure 7:
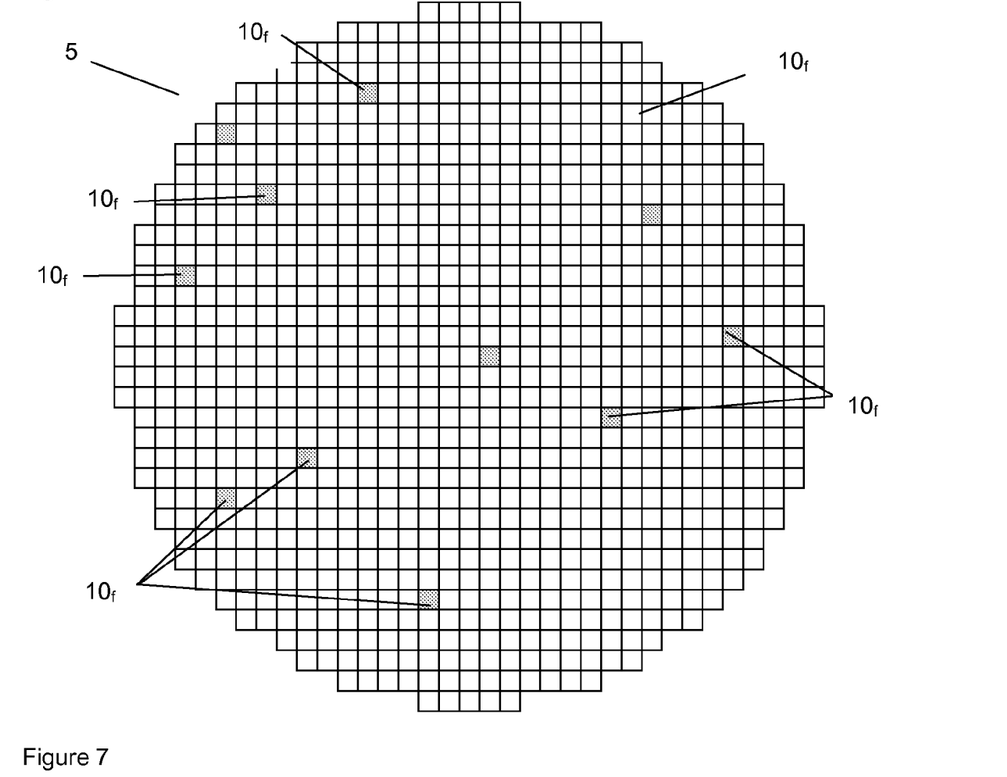
FIG. 7 illustrates a substantially circular phased array antenna assembly with randomly failed modules.
Figure 8:
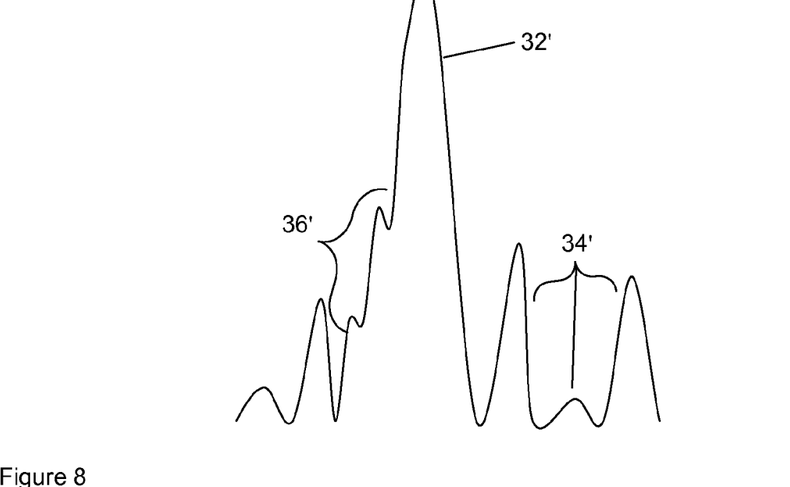
FIG. 8 represents a far field pattern from an antenna assembly having some failed modules or sub-array(s)

FIG. 7 represents a substantially circular phased array antenna assembly 5 having a number of randomly failed modules $15_f$. As the number of failed modules $15_f$ increases, distortions in the far field pattern can be seen (as represented by FIG. 8). For example, the gain of the main beam 32' may be reduced and the main beam may, additionally, be broadened. The magnitude of the side lobes 34' may increase and the symmetry of the side lobes 34' may be destroyed. Furthermore, a ripple effect 36 may be experienced by the main beam 32'. This distortion is reflected in the $\Delta/\Sigma$ curve of FIG. 5 in that the linearity of the trace deteriorates and the gradient $\lambda$ may be altered. Consequently, variations and distortions observed in the far field pattern and the $\Delta/\Sigma$ curve of FIG. 5, may be indicative of some failure in one or more components of the array assembly 5.

The BITE functionality is used to calculate a far field pattern of an antenna array assembly 5 and to compare this pattern with a predetermined standard template. The comparison quantifies any variation from the standard template and assesses whether any such variation is within acceptable limits or not. BITE is also used to track the status of individual modules 15, to ascertain whether they are functioning appropriately or whether any failure has occurred.

The $\alpha/\Sigma$ curve is recalculated and linearity of the central portion of the curve (of FIG. 5) is assessed by making a comparison with a standard template curve. If the comparisons show that any particular distortion is too severe, an optimisation, for example a Nelder-Mead Simplex method or a method of Steepest Descent, on the standard coefficients, e.g. phase $\phi$ and amplitude a applied at the module level is carried out to generate modified coefficients $\phi'$, and a' used to compensate for any failed modules and return the far field pattern and monopulse patterns to acceptable limits.

BITE is used to verify the acceptability of the new calibration and ensure that the patterns and curves approximate the original standard templates adequately. Parameters/characteristics such as antenna beam width, gain, side lobes in addition to the linearity and gradient of the $\Delta/\Sigma$ relationship are derived and used in the comparison and subsequent verification of the modified coefficients $\phi'$, a'.

Once suitable modified coefficients (e.g. $\phi'$, a') have been ascertained these are substituted for the original values (e.g. $\phi$, a) in the base settings of each respective module $15_i$ to achieve an acceptable overall antenna performance during normal operation.

Finally, normal operation of the antenna installation is continued and BITE continues to undertake regular checks to ensure that the new settings yield acceptable results.

The phased array antenna assembly 5, represented by FIG. 1, may comprise a multitude of radiating elements $10_i$, for example in excess of 2000. Whilst it is possible to process signals received by each element during operation of the radar installation, to do so would be prohibitively expensive at present. Processing of received signals is, however, likely to be performed on such a basis in the future as conversion of analogue signals to digital signals becomes cheaper to undertake and the performance of computers further improves.

Figure 9:
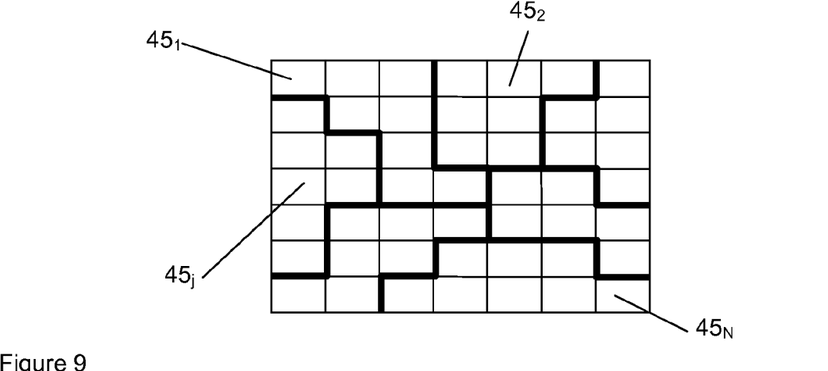
FIG. 9 shows a schematic representation of a phased array antenna assembly comprising a number of sub-arrays.

As a compromise, it is known for the multitude of elements $10_i$ to be grouped together to form a smaller number of sub-arrays $45_j$ (j=1 to N) as illustrated in FIG. 9. Each sub-array $45_j$ has a receiver $50_j$ associated therewith which takes a combined, received analogue signal and converts it to a digital signal for further processing.

The number, say N, of sub-arrays $45_j$ present in the phased array antenna assembly 5 is generally fixed. However the configuration of elements $10_i$ within any particular sub-array $45_j$ is typically not regular in pattern although each of the elements $10_i$ that form a sub-array $45_j$ are generally located adjacent to one another.

A radar installation 40, having a phased array antenna assembly 5 formed from a number of sub-arrays $45_j$ may perform "digital adaptive beam forming" which can be used, for example, to counter jamming signals in the received signals. Signals in the sub-arrays $45_j$ are sampled and knowing when wanted signal returns would appear in the receivers, the unwanted jamming signals can be identified and minimised by changing weighting factors $\omega_j$ applied to each sub-array $45_j$.

Figure 10:
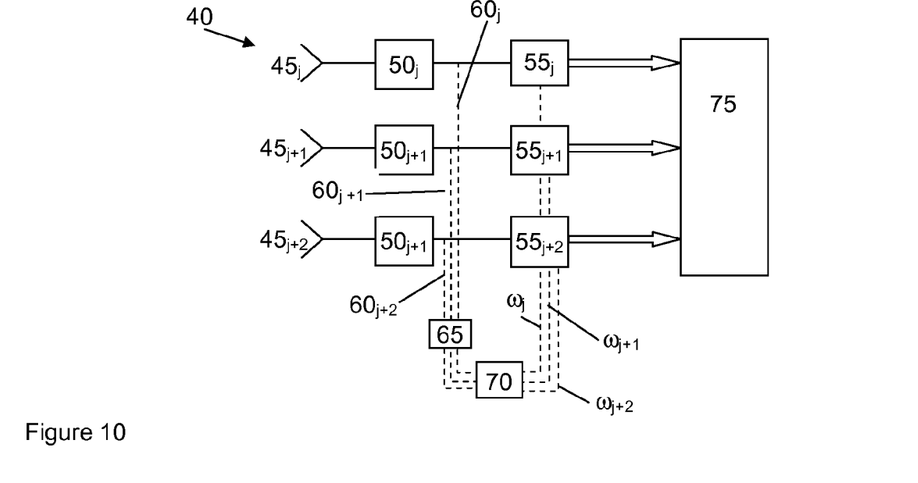
FIG. 10 shows a schematic representation of three sub-arrays used in a digital adaptive beam forming process.

FIG. 10 illustrates a radar installation 40 in which a digital adaptive beam forming process is used. The installation 40 comprises a number of sub-arrays 45, three are shown in this example for illustrative purposes. Each sub-array $45_j$ has a receiver $50_j$ associated therewith. A returned signal, received by a sub-array $45_j$, is passed through the receiver $50_j$, down-converted to in-phase and quadrature signals at a lower frequency and held in an associated buffer store $55_j$ while adaptive weighting factors $\omega_j$ are calculated as follows.

A sample signal 60 is taken from each of the sub-arrays $45_j$, clutter is removed by a filtering module 65 and the resulting filtered signal is then passed to a computer/processing module 70. The processing module 70 uses a noise minimisation algorithm to calculate a set of weighting factors $\omega_j$. Such noise minimisation is carried out by forming simultaneous linear equations for the unknown weights. For each sample time, one equation expresses the requirement that the total noise received should be zero. Additional equations express requirements to maintain the antenna beam shape.

The entire system of equations cannot be solved exactly because it is over-determined; there are more equations than unknown weights. However, an approximate solution can be obtained in a least-squares sense by forming the covariance matrix of the equation system coefficients and solving the resulting reduced system of equations.

The weighting factors $\omega_j$ are subsequently applied to the filtered signal to minimise any unwanted signals by modifying the phase and amplitude thereof. Each original signal is then retrieved from the respective buffer store $55_j$ and each sub-array value is multiplied by a respective weighting factor $\omega_j$ to produce a signal with a noise minimised output.

Individual signals from the respective sub-arrays $45_j$ are then summed to form a modified composite pattern 100' using a summing module 75.

Figure 11:
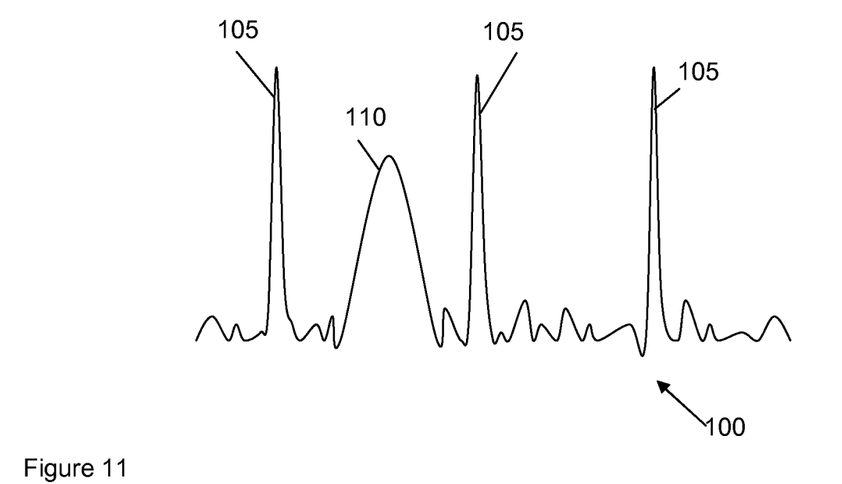
FIG. 11 shows a returned signal representing a target and several jamming signals.

An example composite pattern 100 having three jamming signals 105 is illustrated in FIG. 11. The three jamming signals 105 dominate the pattern so that the desired signal 110, appearing in the main beam cannot be separated from the jamming signals 105.

Figure 12:
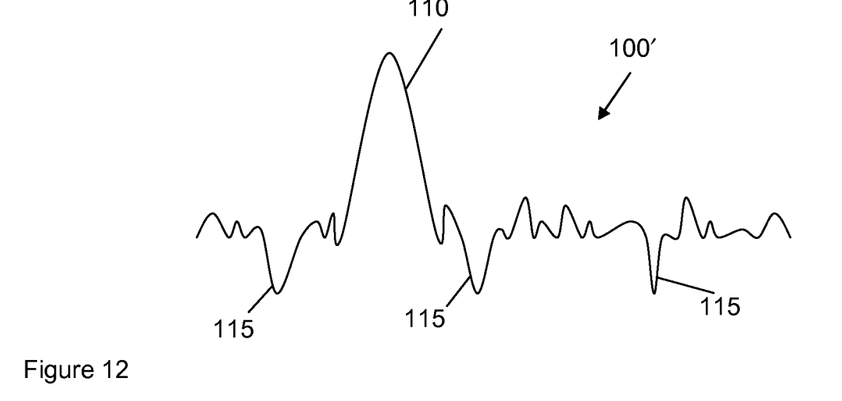
FIG. 12 shows the signal of FIG. 8 after processing.

By using the digital adaptive beam forming process described above, the modified composite pattern 100' (shown in FIG. 121) formed by summing the individual weighted signals from respective sub-arrays $45_j$ exhibits nulls 115 in the direction of the jamming sources. The noise level in the receiver is, therefore, minimised enabling a desired signal 110 to be detected in the presence of the jamming signals.

Figure 13:
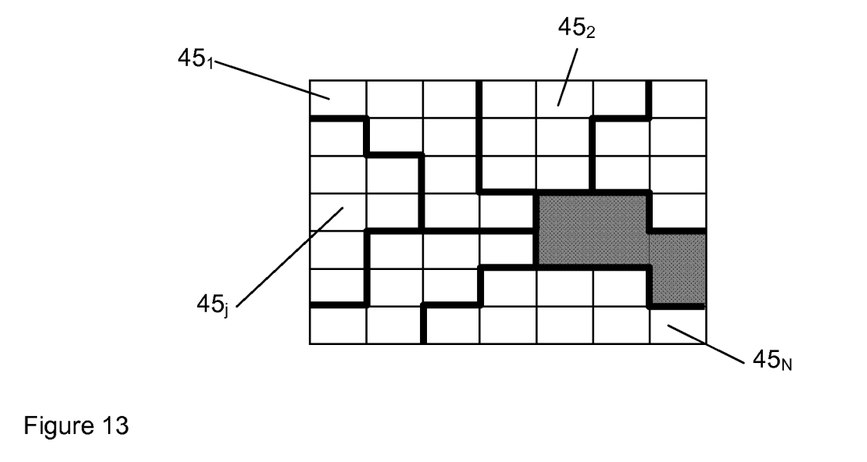
FIG. 13 represents the phased array antenna assembly shown in FIG. 9 with a failed sub-array.

If one sub-array $45_f$ or a number of elements $10_f$, experiences failure as represented by FIG. 13, the overall composite pattern 100, 100', output from the summing module 75, may become distorted. If the main beam is particularly affected, distortions in one or both of the beams ($\Delta$ and $\Sigma$) will occur. The failure causes a ripple effect 36 in the far field pattern (see FIG. 8) which may be minimal at the top of the trace representing the beam and more exaggerated at the bottom of the trace. This distortion of the, sum ($\Sigma$) and/or the difference ($\Delta$) beam affects the ratio ($\Delta/\Sigma$) and consequently affects the relationship of this ratio ($\Delta/\Sigma$) to the target angle ($\alpha$) illustrated in the graph of FIG. 5. As discussed above, it is desirable to retain the linearity of this relationship to enable the bearing angle ($\alpha$) of the target to be ascertained.

Implementation of an antenna performance optimisation technique, described above at an element level, aims to maintain a linear relationship between the two signals $\Delta$, $\Sigma$. The technique can readily be applied at the sub-array level too.

A far field pattern 100, 100' is output from the summing module 75. This pattern contains a, potentially severe, distortion in the main beam 32' and side lobes 34', due to failed elements $10_f$ or failed sub-array $45_f$. Each sub-array $45_j$ contributes to the far field pattern 100, 100' in a known manner. The phase and amplitude of signals received by other elements $10_i$ or sub-arrays $45_j$ can be independently adjusted by modifying the standard coefficients of each respective module $15_i$.

Once again, the BITE functionality is used to calculate a far field pattern of an antenna array assembly 5' and this pattern is compared with a predetermined standard template. Additionally, a composite pattern at the sub-array level can be generated and compared to an equivalent plot (standard template) generated when the sub-array $45_j$ was fully functional (prior to any failures). Such a comparison enables any variation from the standard template to be quantified thus enabling an assessment regarding whether any such variation is within acceptable limits or not. As before, BITE is also used to track the status of individual modules $15_j$ to ascertain whether they are functioning appropriately or whether any failure has occurred. BITE may also be used at the sub-array level to track an equivalent status of each and every sub-array $45_j$.

The $\Delta/\Sigma$ curve is recalculated and linearity of the central portion of the curve (of FIG. 5) is assessed by making a comparison with a standard template curve. If the comparisons show that any particular distortion is too severe, an optimisation, a Nelder-Mead Simplex method or a method of Steepest Descent, on the standard coefficients, e.g. phase $\phi$ and amplitude a applied at the module level is carried out to compensate for any failed modules $15_f$ and return the far field pattern and monopulse patterns to acceptable limits.

Figure 14:
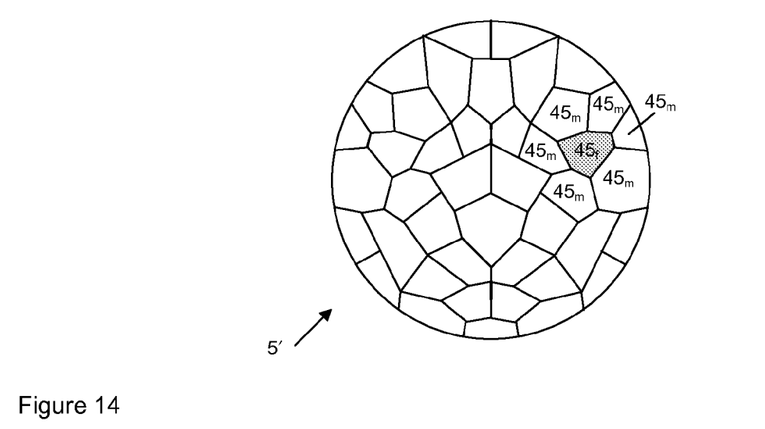
FIG. 14 represents a first proposal for compensating for a failed sub-array in a substantially circular phased array antenna assembly.
Figure 15:
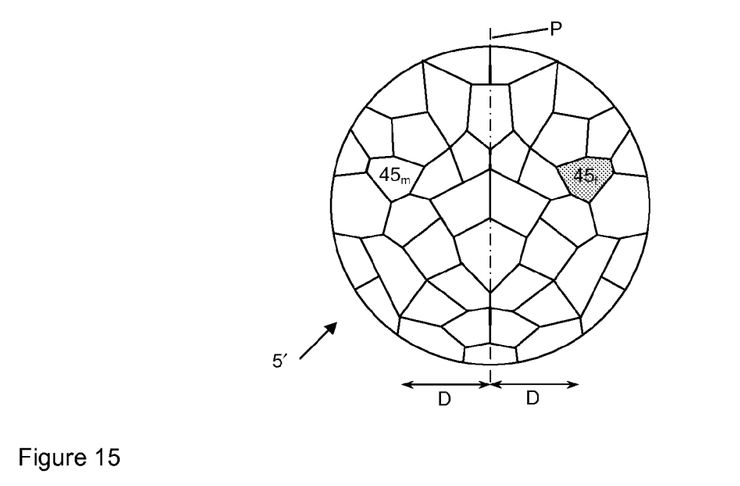
FIG. 15 represents a second proposal for compensating for a failed sub-array in a substantially circular phased array antenna assembly.
Figure 16:
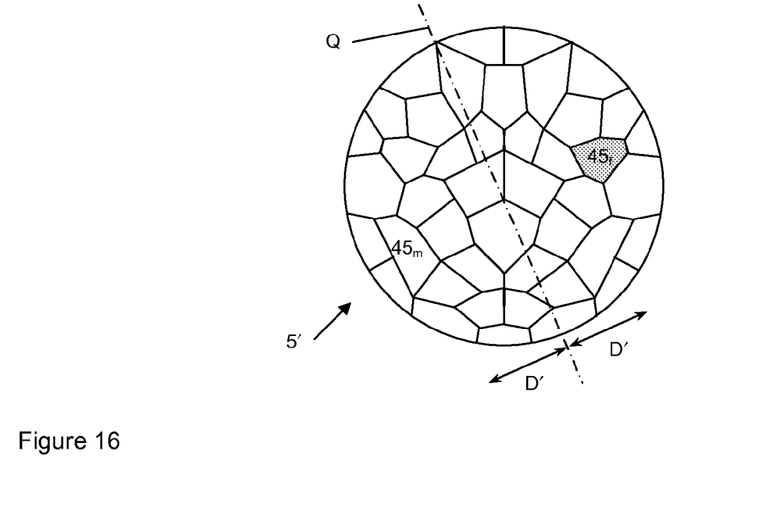
FIG. 16 represents a third proposal for compensating for a failed sub-array in a substantially circular phased array antenna assembly.

The optimisation may be applied to all modules $15_i$ or sub-arrays $45_j$ across the antenna assembly 5' or, alternatively, just to certain sub-arrays. FIGS. 14 to 16 illustrate possible applications of the technique to sub-arrays $45_m$ in a substantially circular phased array antenna assembly 5' experiencing a failed sub-array $45_f$.

The sub-arrays $45_m$ to which the adjusted values of phase $\phi$ and amplitude a are applied may be those directly adjacent to the failed sub-array $45_f$ as illustrated in FIG. 14. In contrast, the, or each, sub-array $45_m$ to be modified may be located remotely from the failed sub-array $45_f$ in a balanced manner. In the examples shown in FIGS. 15 and 16, the sub-array $45_m$ to be modified is located the same distance, D, D', from a central axis, P, Q, of the installation 5' as the failed sub-array $45_f$. Alternatively, each and every sub-array $45_j$ of the phased array antenna assembly 5' may be subject to a corresponding adjusted phase $\phi$ and amplitude a parameters (not shown).

A library or set of rules can be established whereby certain failures respond well to modification of certain sub-arrays $45_m$. In so doing, future modes of failure of the antenna assembly 5' can be addressed and compensated for more rapidly.

BITE is used to verify the acceptability of the new calibration and ensure that the patterns and curves approximate the original standard templates adequately. Parameters/characteristics such as antenna beam width, gain, side lobes in addition to the linearity and gradient of the $\Delta/\Sigma$, relationship are derived and used in the comparison/verification of modified coefficients.

Once suitable modified coefficients have been ascertained these are substituted for the original values (e.g. of phase $\phi$ and amplitude a) in the settings of each module to achieve overall antenna performance during normal operation.

Finally, normal operation of the antenna installation is continued and BITE continues to undertake regular checks to ensure that the new settings yield acceptable results.

The antenna is reset with modified phase $\phi$ and amplitude a values which are setup after the optimisation process has been completed. Ultimately, it is anticipated that the optimisation is to be performed in real time but in this embodiment, operation of the radar installation would be stopped to carry out the phase $\phi$ and amplitude a correction process, the process being completed prior to re-initiation of the radar. Thus, the pattern 100, 100' is artificially adjusted.

In the extreme, the contribution from particular elements $10_i$ and/or sub-arrays $45_j$ may be reduced to zero using the coefficients $\phi$, a or by withdrawal of power to said elements $10_i$ and/or sub-arrays $45_j$. In either case, the optimisation results in a modified far field pattern 100" (not illustrated) that approximates the original composite far field pattern 100, 100'. In so doing, failure of one or more elements $10_f$ or sub-arrays $45_f$ may lead to broadening of the beam but retention of the linear relationship of the $\Delta/\Sigma$, curve.

Digital adaptive beam forming, where used, continues to operate and adapt to remove jamming signals as described above, using the newly calculated phase $\phi$ and amplitude a values.

The invention claimed is:

1. A method for compensating for the failure of an element in a phased array antenna assembly, the method comprising the steps of:
   a) generating a post-failure composite pattern from signals received by respective elements in the phased array antenna assembly after failure of an element of the phased array antenna assembly;
   b) comparing the post-failure composite pattern to a standard composite pattern generated prior to the failure to assess necessity for remedial action;
   c) if remedial action is necessary, assuming an initial value for at least one parameter associated with each element;
   d) if remedial action is necessary, performing optimisation on the parameters to generate a modified post-failure composite pattern which approximates the standard composite pattern;
   e) if remedial action is necessary, applying the optimised parameters to base settings for the phased array antenna assembly; and
   f) continuing with operation of the phased array antenna assembly;
   wherein the step of performing optimisation on the parameters comprises the steps of:

i) generating the modified post-failure composite pattern based on the optimised parameters; and ii) comparing the modified post-failure composite pattern to the standard composite pattern to assess whether acceptable performance is achieved;

wherein the generating step a) comprises generating a post-failure curve of antenna pattern difference/sum ratio ($\Delta/\Sigma$) plotted against offset angle ($\alpha$) for the entire phased array antenna assembly;

wherein the comparing step b) comprises comparing the post-failure $\Delta/\Sigma$ curve with a standard $\Delta/\Sigma$ curve generated prior to the failure, in addition to assessing necessity for remedial action;

wherein the generating step i) comprises generating a modified post-failure curve of antenna pattern difference/sum ratio ($\Delta/\Sigma$) plotted against offset angle ($\alpha$) for the entire phased array antenna assembly; and wherein the comparing step ii) comprises comparing the modified post-failure $\Delta/\Sigma$ curve with the standard $\Delta/\Sigma$ curve generated prior to the failure, in addition to assessing whether acceptable performance is achieved.

2. A method according to claim 1, wherein:

the generating step a) comprises generating the post-failure $\Delta/\Sigma$ curve using a monopulse measurement for the entire phased array antenna assembly; and in step b), the standard $\Delta/\Sigma$ curve generated prior to the failure comprises a monopulse measurement generated curve.

3. A method according to claim 1, wherein the parameters are phase and amplitude.

4. A method according to claim 1, wherein the element is a module comprising an antenna element.

5. A method according to claim 1, wherein the element is a sub-array comprising at least one module, the, or each, module comprising an antenna element and each parameter being associated with the, or each, module of the sub-array.

6. A method according to claim 5, wherein the applying step e) applies the optimized parameters to modules in selected sub-arrays of the phased array antenna assembly.

7. A method according to claim 6, wherein the optimized parameters are applied to sub-arrays located directly adjacent to the failed sub-array.

8. A method according to claim 6, wherein the optimized parameters are applied to sub-arrays located remotely from the failed sub-array in a balanced manner.

9. A method according to claim 5, wherein the applying step e) applies the optimized parameters to modules in all sub-arrays of the phased array antenna assembly.

10. A phased array antenna assembly comprising:
a plurality of modules, each module comprising an antenna element; and
a controller, for controlling the phased array antenna assembly, configured to perform a method according to claim 1.

11. A radar installation comprising a phased array antenna assembly according to claim 10.

* * * * *